United States Patent [19]

Vitale

[11] 3,970,509
[45] July 20, 1976

[54] APPARATUS FOR SIMULTANEOUSLY CUTTING, SEALING AND STITCHING THERMOPLASTIC MATERIAL

[75] Inventor: Joseph Vitale, Charlotte, N.C.
[73] Assignee: Perfect Fit Industries, Inc., Monroe, N.C.
[22] Filed: Nov. 18, 1974
[21] Appl. No.: 524,690

[52] U.S. Cl. ................................. 156/580; 228/1
[51] Int. Cl.² .................... B29C 27/08; B32B 31/16
[58] Field of Search ................ 156/580, 73.1–73.4, 156/515; 228/1, 110; 264/23; 425/174.2

[56] References Cited
UNITED STATES PATENTS

| | | | |
|---|---|---|---|
| 3,586,589 | 6/1971 | Jugler | 156/580 |
| 3,607,534 | 9/1971 | Gutman | 156/515 X |
| 3,687,787 | 8/1972 | Grand | 156/580 X |
| 3,737,361 | 6/1973 | Obeda | 156/580 |
| 3,764,442 | 9/1973 | Parry | 156/580 |

Primary Examiner—William A. Powell
Assistant Examiner—M. G. Wityshyn
Attorney, Agent, or Firm—Seidel, Gonda & Goldhammer

[57] ABSTRACT

An ultrasonic horn cooperates with a cutting wheel and two stitching wheels to simultaneously cut, seal and stitch thermoplastic material. The cutting and stitching wheels are urged towards the ultrasonic horn by a spring biased pivot arm upon which the wheels are rotatably mounted. The combination of ultrasonic horn, wheels and pivot arm define a cutting assembly. The entire cutting assembly is connected to the reciprocating rod of a piston which alternately lowers the cutting assembly into a cutting position wherein the material to be cut is located between the horn tip and the wheels, and raises the cutting assembly into a return position wherein the material to be cut is below and out of contact with the cutting assembly.

3 Claims, 5 Drawing Figures

APPARATUS FOR SIMULTANEOUSLY CUTTING, SEALING AND STITCHING THERMOPLASTIC MATERIAL

BACKGROUND OF THE INVENTION

The present invention relates to the field of ultrasonics. More specifically, this invention relates to an apparatus for simultaneously cutting, sealing and stitching thermoplastic material using an ultrasonic horn assembly.

Ultrasonic energy has long been employed to both melt and cut metallic or non-metallic thermoplastic materials. In a typical application, high frequency currents are applied to a transducer which converts electrical energy into mechanical energy in the form of vibrations in the ultrasonic horn. The exact orientation of these vibrations will depend on the particular shape and structural characterisitics of the horn. The most prevalent horn used for cutting takes the shape of a tapered cone. Such a horn will insure a concentration of longitudinal vibrations at the horn tip.

When the tip of the horn is biased against a rigid material such as metal, the longitudinal vibrations at the horn tip will transfer vibrational energy to the metal at the point of contact. Frictional forces induced within the metal work pieces will then heat the metal and thereby produce the desired cut.

This procedure will not be successful when the material to be cut is a flexible thermoplastic. In such a case the vibrations transferred from the tip of the horn to the thermoplastic material will be widely distributed throughout the material. As such, the friction induced in any one section of the material will not be sufficient to produce adequate heating. In order to overcome this problem, a rigid anvil may be utilized to concentrate the transferred mechanical energy in a small swatch of the thermoplastic material. In a typical application, a flat faced anvil having a surface area smaller than that of the horn tip will be used to firmly press the flexible thermoplastic material against the face of the horn tip. In this way, substantially all of the vibrational energy transferred to the material will be concentrated in the area defined by the face of the anvil. The internal frictional forces between the fibers of the thermoplastic material will thereby melt the material along the surface defined by the face of the anvil. If the area of concentration is sufficiently small, the heat will be sufficiently intense to actually cut the material being worked on.

The above characteristics of ultrasonic horns are well-known in the art and have been employed to provide stitch seams in thermoplastic sheet-like elements. One such application can be found in U.S. Pat. No. 3,666,599 issued to Edward G. Obeda. The present invention exceeds the level of the prior art by providing a fully automatic apparatus which can simultaneously cut, seal and stitch thermoplastic material.

BRIEF SUMMARY OF THE INVENTION

Apparatus is provided for simultaneously cutting, sealing and stitching thermoplastic material. A plurality of wheels are biased against the flat cutting head of an ultrasonic horn. The stitching wheels are rotatably mounted on a spring loaded pivot arm which urges the wheels towards the cutting head while the cutting wheel is rigidly biased against the cutting head. Reciprocating means are provided for alternately placing the cutting head and the wheels in a first position wherein the material is situated between the cutting head and the wheels, and a second position wherein the cutting head and the wheels are disposed from and out of contact with the material.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 5 is a simplified expanded perspective view showing the relative positioning of the horn tip, thermoplastic material and cutting wheels.

DETAILED DESCRIPTION OF THE PREFERRED EMBODIMENT

Figure 1:
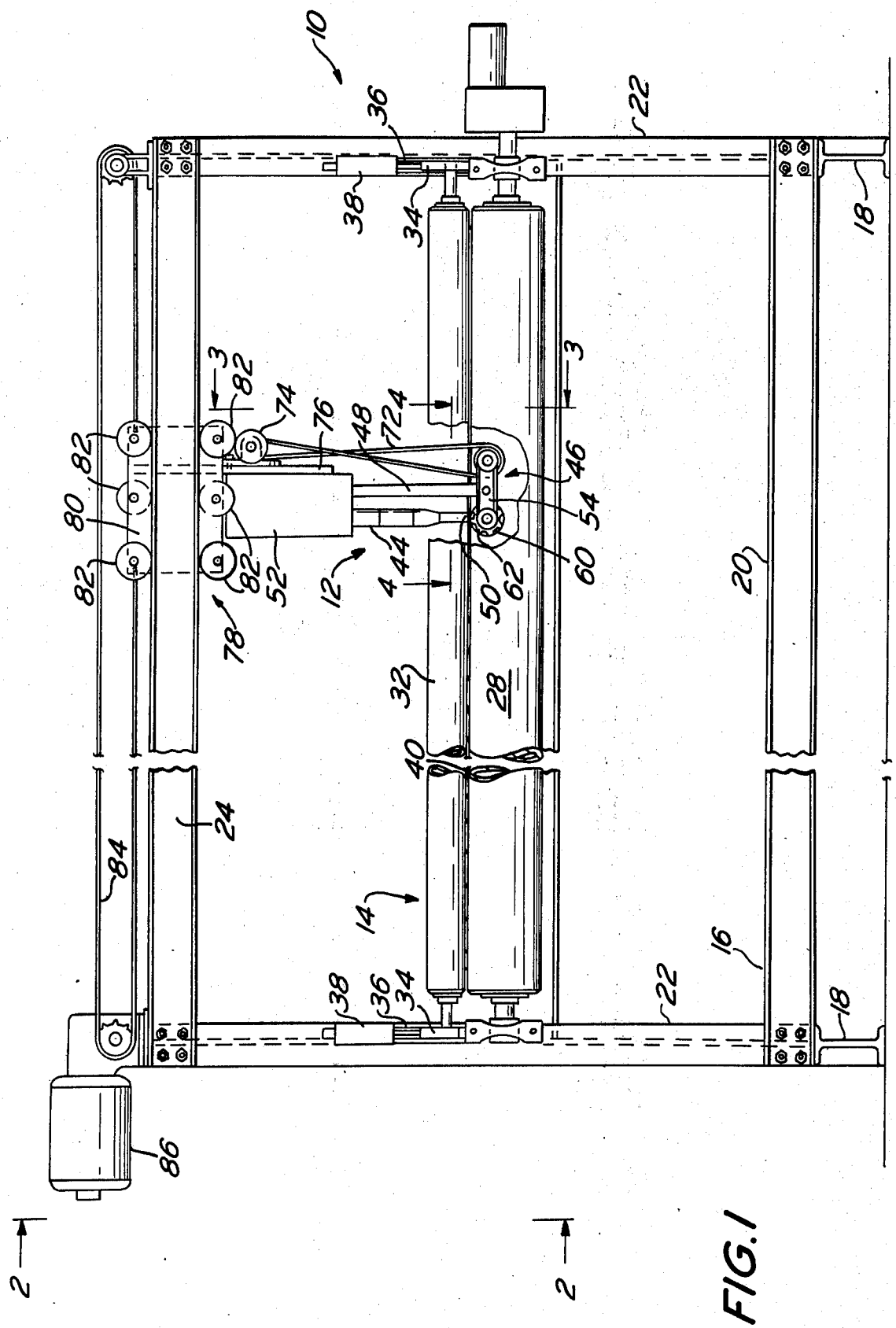
FIG. 1 is a front view partially broken away, of the apparatus comprising the herein disclosed invention.

Referring to the drawing, wherein like numerals indicate like elements, there is shown in FIG. 1 the cutting, sealing and stitching machine in accordance with the herein disclosed invention designated 10. The cutting assembly 12, as well as the roller assembly 14, is mounted upon the frame assembly 16.

The frame assembly 16 consists of base members 18, horizontal support members 20, vertical support members 22, and transverse support member 24. In the preferred embodiment, the base members 18 are I-beams, while the remaining support members 20, 22, and 24 are channel beams. The various support members 18, 20, 22, and 24 are metallurgically or mechanically coupled to one another so as to provide a rigid support for cutting assembly 12 and roller assembly 14.

Figure 2:
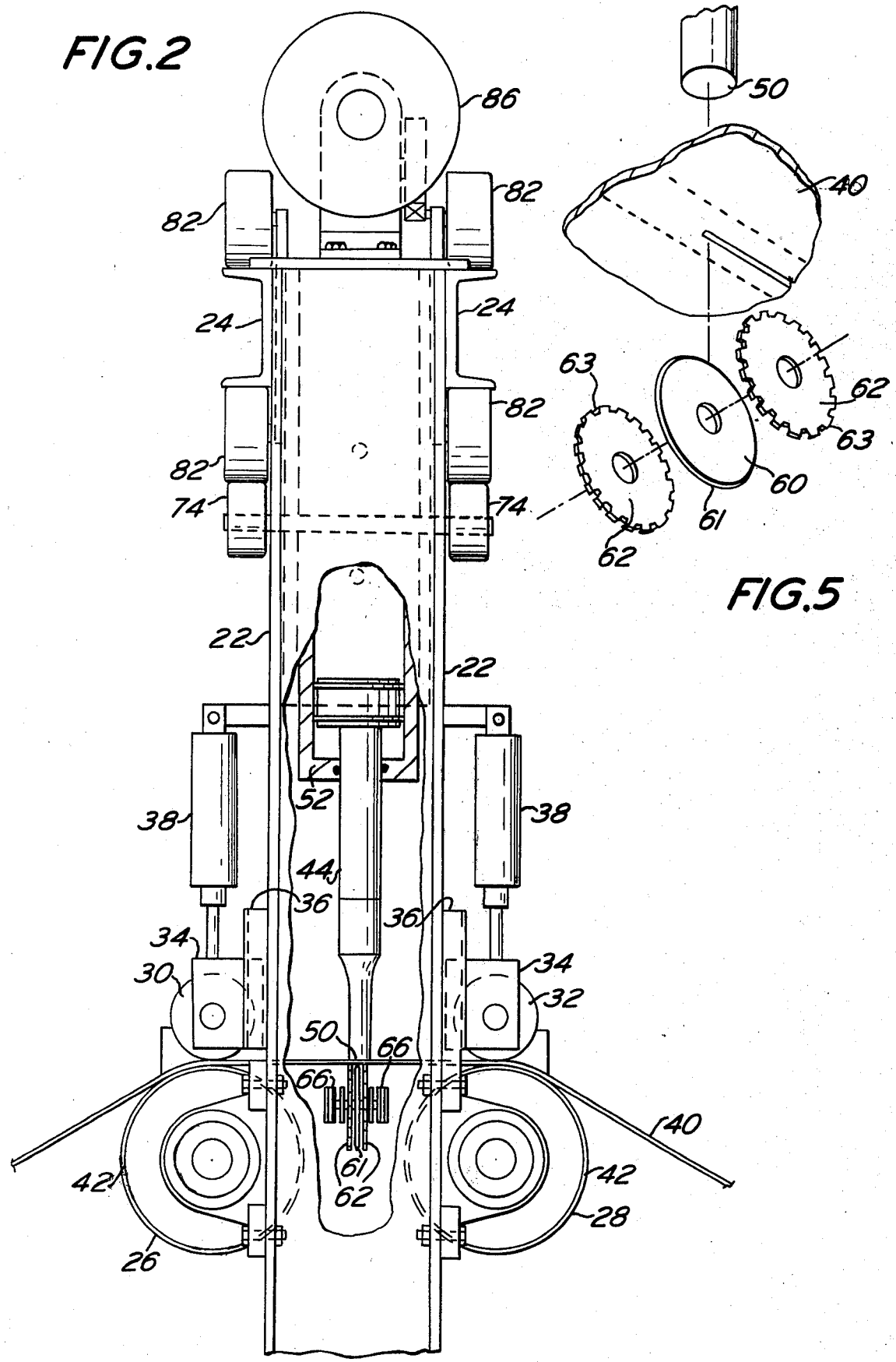
FIG. 2 is an elevated side view, partially broken away, taken along line 2—2 of FIG. 1.
Figure 3:
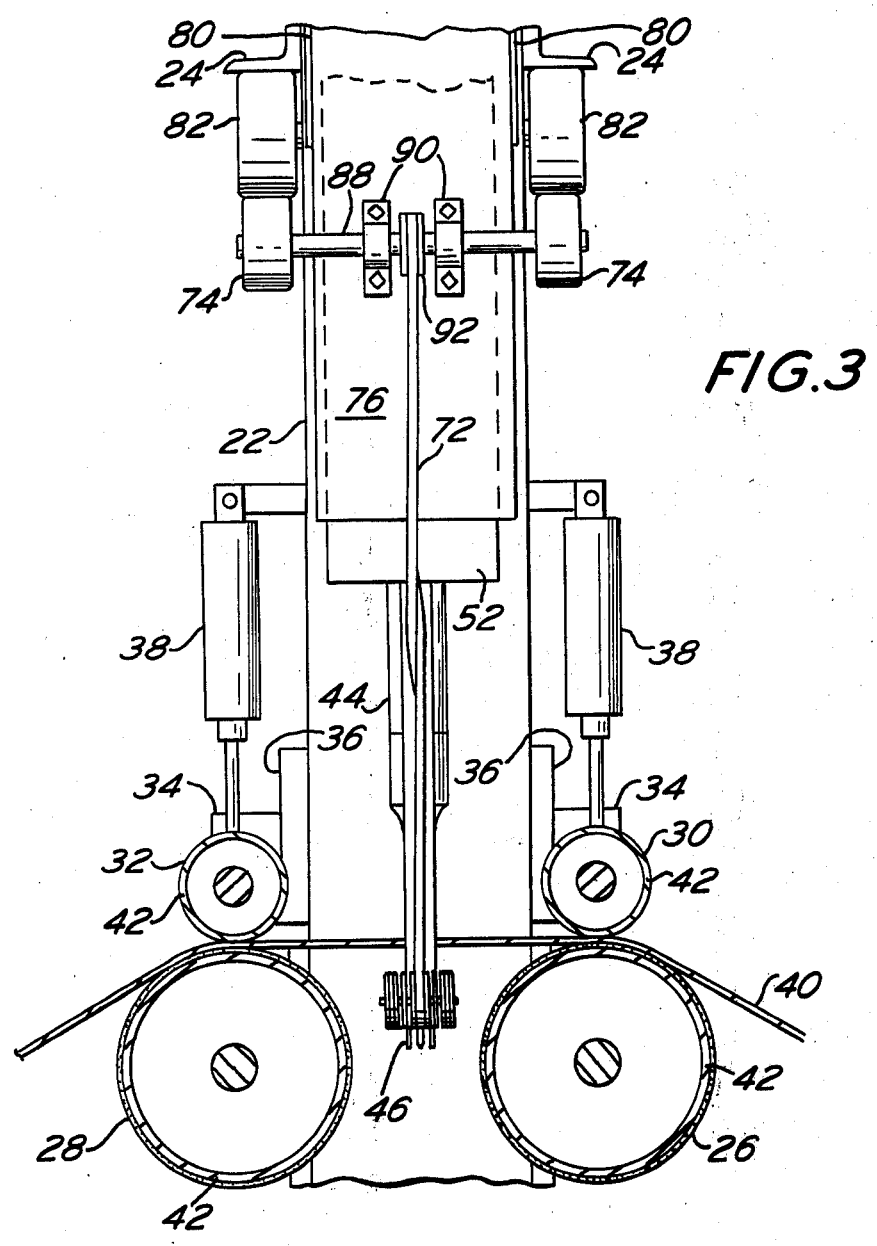
FIG. 3 is an elevated side view, partially in cross section, taken along line 3—3 of FIG. 1.

As can best be seen in FIGS. 2 and 3, roller assembly 14 consists of motor driven feed roller 26, motor driven exit roller 28 and idler rollers 30 and 32. Rollers 26 and 28 are rotatably mounted on vertical support members 22. Idler rollers 30 and 32 are rotatably mounted on brackets 34. Brackets 34 are, in turn, mounted on slide guides 36 of vertical support members 22. Air cylinders 38 are coupled to each end of idler rollers 30, 32 and lift these rollers so as to provide a gap for threading the thermoplastic material 40 which is to be cut by the machine 10. Idler rollers 30 and 32 are positioned above rollers 26 and 28 so that when pistons 38 are extended, idler rollers 20 and 32 are urged against rollers 26 and 28 respectively. In this way, idler rollers 30 and 32 provide a pressurized nip section for grasping the material 40 which is to be cut by the machine 10. Each roller 26, 28, 30 and 32 is provided with a high friction covering 42 such as rubber or high friction tape to increase its gripping capabilities.

The thermoplastic material 40 enters the machine 10 at the interface of rollers 36 and 30 and exits at the interface of rollers 28 and 32. Rollers 26 and 28 are provided with adjustable speed drive motors (not shown) which will both pull the material through the machine and apply a slight holding force so as to create tension in the material located between the feed roller 26 and exit roller 28. For purposes of reference, the thermoplastic material 40 located between rollers 26 and 28 define what may be referred to as a cutting plane. The speed of each drive motor can be set to apply the proper tension required by different types of thermoplastic material 40. An air brake (not shown) is associated with each roller 26, 28 to maintain material tension after the rollers 26, 28 have stopped.

Referring again to FIG. 1, the cutting assembly 12 consists of an ultrasonic horn 44, a cutting wheel assembly 46, and a support bar 48. In the preferred embodiment, the ultrasonic horn 44 is a standard catenoidal horn with replaceable tips, booster and converter. Typically, such a horn will convert a 20,000 hertz input signal into mechanical force in the form of a vertical vibration in the horn tip or cutting head 50. However, it should be recognized that other types of horns operating at various frequencies may be employed without deviating from the spirit of the invention.

Figure 4:
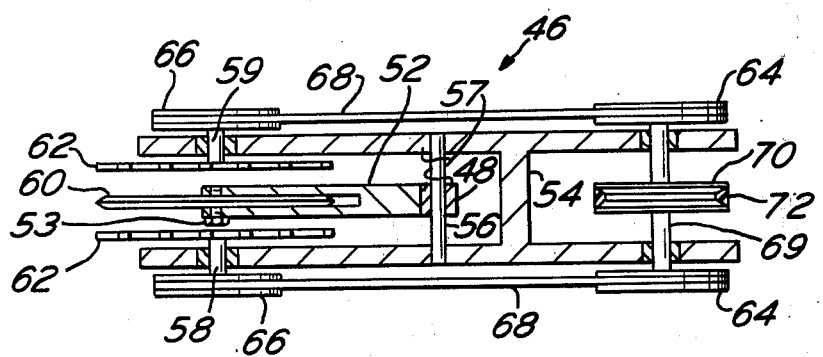
FIG. 4 is an enlarged top view of the cutting wheels and pivot arm taken along line 4—4 of FIG. 1.

The construction of cutting wheel assembly 46 can best be understood with reference to FIGS. 1 and 4. A spring loaded pivot arm 54 is pivotally mounted on support bar 48 by pin 56. Shafts 58 and 59 extend through the forward end of spring loaded pivot arm 54 and are rotatably mounted thereon. At least one stitching wheel 62 is rigidly mounted on each shaft 58, 59. The placement of stitching wheels 62 is such that in the absence of any material both wheels come into contact with horn tip 50 when spring loaded pivot arm 54 biases the shafts 58 and 59 towards the horn tip 50.

As can be seen in FIG. 4, the front end of pivot arm 54 is biased towards the horn tip 50 by torsion spring 57. One end of torsion spring 57 is attached to support bar 48 and the other end is attached to pivot arm 54. It should be noted that the use of a torsion spring to bias the front of the pivot arm in the direction of horn tip 50 is merely exemplary and any equivalent means for effectuating this result may be used without exceeding the spirit or the scope of the herein disclosed invention. The only critical limitation in this respect is that the stitching wheels 62 must be biased against the horn tip 50 at such a pressure that the material 40 located between the working edges 63 of the stitching wheels 62 and the horn tip 50 is melted but not actually cut. This limitation is discussed in further detail below.

Cutting wheel 60 is rigidly connected to cutting wheel support member 52 by bolt 53. Bolt 53 prevents the cutting wheel 60 from rotating as the cutting assembly 12 traverses the material 40. However, if the beveled working edge 61 flattens from use, the bolt 53 may be loosened and the cutting wheel 60 rotated to expose a new surface to horn tip 50. Cutting wheel support member 52 is rigidly connected to support bar 48 and depends horizontally therefrom. The positioning of support member 52 is such that cutting wheel 60 will be firmly biased against horn tip 50 at a pressure sufficient to cause the material 40 passing between the working edge 61 of the cutting wheel 60 and the horn tip 50 to be cut. This action is described in greater detail below.

In the preferred embodiment, support bar 48 is adjustable up and down to allow for proper placement of wheels 60 and 62. The spring loaded pivot arm 54 is spring loaded to provide an adjustment for wear or size change. Additional pressure adjustment may be provided by a "knee" type linkage located on support bar 48 by adjusting a pressure screw. Such "knee" type linkages are well-known and conventional in the mechanical arts and therefore need not be illustrated.

The pressure at which the cutting and stitching wheels 60, 62 are biased against the horn tip 50 is critical in determining whether each wheel will cut or stitch the thermoplastic material 40. This is due to the fact that the intensity of the heat energy induced in the material 40 is directly proportional to the pressure at which the cutting wheel 60 presses the material 40 against the horn tip 50. As noted above, the wheels 60, 62 act as rigid anvils which concentrate the transferred vibrational energy in a small swath of the flexible thermoplastic material 40. Exactly how concentrated this energy will be is dependent upon the pressure at which the wheels 60, 62 press the material 40 against the horn tip 50. The greater the pressure, the more concentrated the transferred vibrational energy and therefore the greater the intensity of the heat induced in the material 40.

As can best be seen in FIG. 5, cutting wheel 60 has a sharp beveled working edge 61 which presses the thermoplastic material 40 against the horn tip 50. As the thermoplastic material 40 passes between the horn tip 50 and cutting wheel 60, the vibrational energy in the horn tip 50 is converted to frictional energy in the form of heat in thermoplastic material 40. As noted above, the cutting wheel 60 is firmly biased against the cutting head 50 at a pressure sufficient to cut the material at the point of contact between the working edge 61 and the horn tip 50. In addition to cutting the material 40, the heat produced by the translation of vibrational energy into the material 40 will be sufficient to melt and seal the freshly cut edges on either side of the cutting wheel 60.

Stitching wheels 62 have flat intermittently protruding working edges 63 which press thermoplastic material 40 against horn tip 50 and thereby cause frictional energy at the point of contact. However, since the two outer stitching wheels 62 are spring biased at a lesser pressure than the cutting wheel 60 against the horn tip 50, the heat produced at these points will not be as great and the material will fuse together without actually being cut. In the preferred embodiment, the working edges 63 of stitching wheels 62 are such that they will imprint a dashed pattern along a line recessed from the cut edges of the thermoplastic material 40. In one embodiment, the cutting wheels 60 are positioned such that the dashed pattern is recessed one-quarter inch from the cut edge. However, any distance can be chosen within the limits of the radius of the horn tip 50. This stitching effect not only makes the material more attractive, but adds strength to the cut and sealed edge. While in the preferred embodiment the working edges of stitching wheel 62 were rectangular in shape, other designs such as dots, small circles, or any other desired configuration may be used.

During the operation of the machine 10 (described below), it becomes necessary to rotate stitching wheels 62 while the cutting assembly 12 traverses the thermoplastic material 40. For this reason, rotational energy is transferred from auxiliary drive wheels 64 to shafts 58, 59 via pulleys 66 and belts 68. The auxiliary drive wheels 64 are mounted on shaft 69 which extends through spring loaded pivot arm 54. Auxiliary drive wheels 64 are in turn powered by drive belt 72 and center pulley 70 which is located on the center of shaft 69. Drive belt 72 is driven by drive wheel 74 which will be described in greater detail below. It should be noted at this time that stitching wheels 66 and pulleys 64 are mounted on first and second ends of pivot arm 54 which extend in opposite directions, respectively, from support bar 48.

As best seen in FIGS. 1 and 2, piston 52 supports the cutting assembly 12. Its function is to lower the cutting assembly 12 into a cutting position wherein the thermoplastic material 40 lies between the horn tip 50 and wheels 60 and 62. The horn tip 50 and wheels 60 and 62 will be sustained in this position until the cut is completed, whereupon the piston 52 will raise the cutting assembly 12 above the thermoplastic material 40 so that the cutting assembly 12 may be returned to its initial position while new thermoplastic material 40 is fed into the machine 10. In the preferred embodiment, the piston 52 is a pneumatic piston. However, any other means for alternately raising and lowering the cutting assembly 12 may be utilized.

Referring to FIGS. 1 and 3, the piston 52 is bolted to perpendicular support member 76 of transversing frame assembly 78. Transversing frame assembly 78 consists of two side plate members 80 rigidly displaced by perpendicular support member 76. Side plate members 80 are disposed adjacent to and inside of transverse support members 24 and are slidably mounted thereupon by castors 82. Castors 82 are positioned as shown in FIG. 1 and permit transversing frame assembly 76 to move along transversing support member 24.

A roller chain 84 connects the transversing frame assembly 76 to a variable speed gear head motor 86 positioned on the top of one of vertical support members 22. As noted above, the drive wheels 74 supply rotational energy to drive belt 72. As can best be seen in FIGS. 1 and 3, drive wheel 74 cooperates with two castors 82 to rotate shaft 88. Shaft 88 is rotatably mounted on perpendicular support member 76 by brackets 90. A pulley located on the center of shaft 88 cooperates with drive belt 72 to supply rotational energy to cutting wheel assembly 46. It should be noted at this time that drive belt 72 must be positioned directly behind support bar 52 so that it will not interfere with thermoplastic material 40 during the cutting process. It will also be noted that when the cutting assembly 12 is raised into the return position the drive belt 72 is slack and will not transmit power to auxiliary drive wheels 64.

Having described the structure of the machine 10, I will now describe its operation. When the cutting process is to begin, the idler rollers 30 and 32 are pneumatically lifted by the operation of air cylinders 38. The thermoplastic material 40 will then be placed over both feed roller 26 and exit roller 28. At this time, the idler rollers 30 and 32 will be returned to their normal position wherein the thermoplastic material 40 is securely retained between each pair of rollers. The adjustable speed drive motors will then rotate feed roller 26 and exit roller 28 thereby advancing thermoplastic material 40 through the machine 10. When a predetermined length of material has been drawn through the machine, power to rollers 26 and 28 will be cut off. The motor powering feed roller 26 stops a fraction of a second before the motor powering exit roller 28. In this manner, proper cutting tension in the material 40 located between rollers 26 and 28 is assured. At this point, the cutting assembly 12 is lowered into the cutting position. The cutting assembly 12 is positioned above the extreme right-hand edge (viewed from FIG. 1) of rollers 28 and 32 immediately prior to the beginning of the cutting cycle. Since the thermoplastic material 40 does not extend across the entire length of rollers 26 and 28, wheel assembly 46 will be free to extend below the cutting plane of the thermoplastic material 40 at this time. When the piston 52 has lowered the cutting assembly 12 into the proper cutting position, variable speed gear head motor 86 will begin operation, causing roller chain 84 to pull transversing frame assembly 76 across the length of transverse support member 24. In this way, the thermoplastic material 40 will pass between the horn tip 50 and cutting and stitching wheels 60 and 62, wherein the material will be simultaneously cut, sealed and stitched by the frictional energy imparted from the horn tip 50 to material 40 as described in greater detail above.

When the entire width of the material has been traversed, piston 52 will raise the cutting assembly 12 into a return position wherein the cutting assembly 12 may be returned to its starting position above the extreme right-hand edge of rollers 26 and 28 without interfering with the thermoplastic material 40. It should be noted that the variable speed gear head motor 86 operates at full speed when returning the cutting assembly 12 to its starting position.

While the cutting assembly 12 is being returned to the starting position, the air brakes on rollers 26 and 28 are released and rollers 26 and 28 are actuated. The motor powering feed roller 28 is provided with a very slight delay to allow exit roller 28 to create a gap between the cut edges of thermoplastic material 40. Again, a predetermined length of material is fed into the machine 10 across rollers 26 and 28. When the proper length of material is detected, the power to the rollers will stop and the entire process is repeated.

The present invention may be embodied in other specific forms without departing from the spirit or essential attributes thereof and, accordingly, reference should be made to the appended claims, rather than to the foregoing specification as indicating the scope of the invention.

What is claimed is:

1. A machine for simultaneously cutting, sealing and stitching thermoplastic material, comprising:

A frame assembly;

means mounted on said frame assembly for advancing the material through the machine and for positioning the section of material to be cut along a predetermined cutting plane;

a frame member mounted on said frame assembly transversely to the direction in which the said material is advanced-- was inserted; and in a plane parallel to the cutting plane;

a cutting assembly including a sonic horn having a flat cutting head, a plurality of wheels for pressing the material against said cutting head, and wheel support means biasing the working edges of said wheels against said cutting head;

reciprocating means slidably mounted on said frame member for alternately placing said cutting assembly in a first position wherein said cutting plane is situated between said cutting head and said wheels, and a second position wherein said cutting head and said wheels are disposed from said cutting plane in a direction perpendicular to said cutting plane; and means for moving said reciprocating means and said cutting assembly along said frame member.

2. A machine as claimed in claim 1 wherein said plurality of wheels includes a cutting wheel and a stitching wheel and wherein said wheel support means comprises:
  a support bar connected to said reciprocating means;
  a pivot arm pivotally connected to said support bar, said pivot arm having first and second ends extending in opposite directions, respectively, from said support bar;
  said stitching wheel rotatably mounted on said first end of said pivot arm for concurrent rotation with a first pulley;
  a second pulley rotatably mounted on said second end of said pivot arm;
  a belt connecting said first pulley to said second pulley whereby rotation of said second pulley causes rotation of said first pulley;
  means for rotating said second pulley so as to cause rotation of said stitching wheel; and
  means for biasing said first end of said pivot arm towards said sonic horn.

3. A machine as claimed in claim 2 wherein said reciprocating means includes a pneumatic piston.

* * * * *

UNITED STATES PATENT OFFICE
CERTIFICATE OF CORRECTION

PATENT NO. : 3,970,509
DATED : July 20, 1976
INVENTOR(S) : Joseph Vitale

It is certified that error appears in the above-identified patent and that said Letters Patent are hereby corrected as shown below:

In Claim 1, line 10, delete "-- was inserted;".

Signed and Sealed this

Fifth Day of October 1976

[SEAL]

Attest:

RUTH C. MASON
*Attesting Officer*

C. MARSHALL DANN
*Commissioner of Patents and Trademarks*